April 21, 1964 P. J. G. RICHAUD 3,130,041
METHOD OF SIMULTANEOUS PRODUCTION OF LOW-SILICON
IRON AND HIGH-ALUMINA SLAG
Filed Aug. 11, 1961
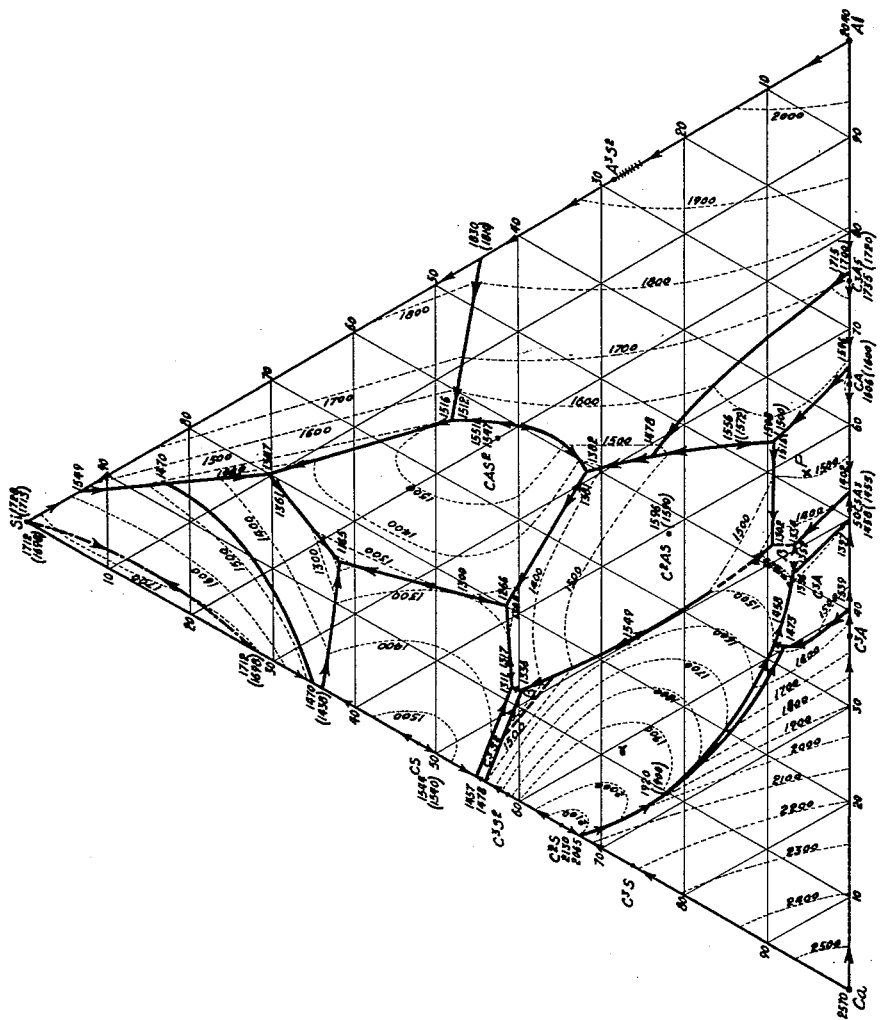
*INVENTOR.*
PIERRE JOSEPH GABRIEL RICHAUD
BY
Brumbaugh, Free, Graves & Donohue
his ATTORNEYS.

United States Patent Office 3,130,041
Patented Apr. 21, 1964

3,130,041
METHOD OF SIMULTANEOUS PRODUCTION OF LOW-SILICON IRON AND HIGH-ALUMINA SLAG
Pierre Joseph Gabriel Richaud, Martigues, Bouches-du-Rhone, France, assignor to Ciments Lafarge, Paris, France, a corporation of France
Filed Aug. 11, 1961, Ser. No. 130,789
Claims priority, application France Dec. 23, 1960
7 Claims. (Cl. 75—41)

This invention relates to a method of simultaneously producing low-silicon cast iron and slag of a special grade for high-alumina melted cement having a high degree of refractoriness and high initial strength. The invention also includes, as new products of manufacture, the refractory, high-initial-strength, slags having a very high alumina content of from 40 to 65% (and more) $Al_2O_3$, and cast irons having less than about 0.3% Si.

There is an ever-increasing demand in industry for highly refractory cements simultaneously possessed of good mechanical resistance characteristics and resistance to various aggressive agents, as well as for cast irons having a very low silicon content. For example it is often desired that the cement should withstand temperatures of more than 1700° C.; the allowable setting times may be from a few minutes to three or four hours, and the permissible time for attaining the minimum requisite strength is in many cases only a few hours. In another connection, special malleable grades of cast iron are desired especially for the production of machinable castings in which the presence of silicon in the usual proportions can be objectionable. These requirements appear to be conflicting in view of the teachings of the prior art. In addition, there is the further requirement that such cements and irons be producible under economically feasible conditions.

It has been suggested, as early as thirty years ago, that a mixture of fuel and lime and eventually iron ore and scrap be melted together, in suitable proportions to produce a good cement slag, using a high-temperature blast of 400–600° C., and so as to develop at the blast-pipes a temperature of the order of 1800 to 2000° C., in the range required for melting slags. As fuels, iron-containing shales have inter alia been used, whereby it has been possible to produce silicon-containing cast irons (from 2 to 10% Si depending on the proportion of cast iron or the like added to the melt) capable of having a very low sulfur content. The lime-containing additions used for satisfactory operation were so adjusted as to produce granular, white or grey-blue slags. Slags of this character, actually gas-producer slags, had the following composition:

| | Percent |
|---|---|
| $SiO_2$ | 35–40 |
| $Al_2O_3$ | 18–23 |
| $CaO$ | 38–43 |

Slags produced in the way just described on an average have a substantially higher alumina content that slags from blast furnaces operated for moulding cast iron, and provide cements markedly superior in quality to ordinary blast-furnace cements.

Among the conditions to be fulfilled in obtaining the above results, it was necessary to use fuels of a moderate degree of fineness (larger than 10 cm.), if necessary made into briquettes, and above all maintain the blast temperature at an accurately constant value.

Attempts have also been made to prepare under similar conditions melted aluminous cements and siliceous cast iron. In spite of every care exerted during the manufacturing process no one has ever succeeded so far in producing in a common operation slags or melted cements having an $Al_2O_3$ content higher than 40% and malleable cast irons having a silicon content less than 2%. To improve the fluidity of the slags it has been suggested to inject water vapour or liquid fuels together with the hot blast wind (thereby also increasing the silicon content in the slags and thus making them more fusible), or alternatively to add phosphorous or manganese-containing constituents. All such attempts however have remained unsuccessful in satisfying the current demands of industry.

The applicant has investigated the problem of simultaneously obtaining low-silicon cast iron and lime aluminate base melted cements containing, as cast, less than 1.5% iron oxides and less than 25% silicates, having high strength after 6 hours and suitable for use in mixing refractory concretes having a maximum slag of 10% under load at temperatures higher than 1600° C. These investigations have led the applicant to the surprising finding that, contrary to previously published teachings, the silica or silicon does not readily pass from the iron into the slag or from the slag into the iron beyond a certain definite percentage, and that by reducing the silica content in the slag it is possible to reduce the silicon content in the iron and vice versa, because a state of equilibrium is found to occur for the silica $SiO_2$ as between the slag and the cast iron. Moreover, the applicant's research has shown that such results could be attained in cupola furnaces using very hot blast air, from slagging constituents having a rather low silica content, with or without the addition of scrap into the melt, the slagging constituents being so selected that the resulting slag will conform to a well-defined, predetermined region of the Rankin diagram as revised by Sosman and Andersen.

Accordingly therefore, the method of simultaneous production of very low-silicon cast iron and highly-refractory, high-alumina melted cement, by blowing hot blast air preferably charged with steam with or without oxygen and additional liquid fuels, essentially comprises charging the furnace with regular layers or a homogeneous charge of coke and slagging agents having a low silica content, corresponding to contents of 20–65% $Al_2O_3$, less than 7% $SiO_2$, 10–60% $CaO$ and 1–7% iron oxides, with the granulometry of the charge being desirably 5–25 mm. for the alumina (bauxite), 5–15 mm. for the lime, 5–15 mm. or 25–50 mm. for the coke, and any ores if used being not in a sintered condition, maintaining in the blast pipe area a uniform temperature higher than 2000° C. by blasting air at a temperature of at least 600° C., and discharging separately and in a known manner, the melted slag continuously and the low-silicon cast iron in batches, the discharge of the cast iron being effected at a rate such that the respective positions of the two superimposed liquid phases remains substantially constant, and the depth of the available slag corresponding at least to about 20 minutes' production.

Depending on the size of the furnace used, and on the corresponding operating characteristics, the granulometry of the constituents of the melt would be modified in accordance with the above specified proportions and in the same sense as the dimensions and remaining characteristics.

The tap holes provided for the iron and the slag are in each case determined in accordance with the relative percentages of production outputs of the cast iron and slag corresponding to the charges used.

Proceeding as just specified, the applicant has succeeded in producing, inter alia, constituents corresponding to the following points in Rankin's ternary diagram as corrected by Sosman and Andersen, and shown in the accompanying drawing: $C_2AS$, $CA$, $CA_2$, $C_{12}A_7$, $C_3S$, $C_2S$, $C_3A$, $C_3S_2$, thus travelling through the various "valleys" that characterize the ternary diagram. It is emphasized that the data given by the said diagram have in all cases been confirmed by the practical results actually obtained with the present process, both as regards the melting temperatures of the various constituents and the boundaries between eutectic phases.

Among the advantages of the method of the invention, especially important is the fact that when charging a cupola furnace in homogenous charges (rather than alternate charges as is currently done), the following results are accomplished:

(1) A high proportion of fuel is saved;
(2) The fusion, reduction and other reactions in the cupola furnace are facilitated;
(3) The quality of the products is more uniform;
(4) And finally certain reductions heretofore believed impossible to accomplish are made feasible, e.g. the reduction of very low-grade ores (less than 20% iron or so-called waste by-products such as red muds).

The invention therefore is also directed, among its possible applications, to the direct reduction of such very low-grade ores.

The invention also comprises, on the one hand cast irons containing less than 0.3% Si produced by the process, and on the other hand the melted cements produced from the slags of the process and containing from 38 to 70% $Al_2O_3$, 2–10% $SiO_2$, 45–28% CaO and 0–1.5% FeO and/or $Fe_2O_3$.

A detailed example of the practical working of the method of the invention will now be described.

The process was carried out in a cupola 600 mm. in diameter at the blast pipes, 2.80 m. charge depth above the blast pipes, under a blast pressure of 85 cm. Hg and a blast temperature of 600° C. (with addition of heavy oil in an amount of about 1 to 3 liters per cubic meter air). The vertical distance from the blast nozzles to the slag tap-hole was 300 mm. and the spacing between the slag tap-hole and iron tap-hole was 120 mm. The following charge was treated:

Bauxite, size 5–25 mm., $Al_2O_3$ 54%, $SiO_2$ 6%
Lime, 5–15 mm., $CaCO_3$ 98%
Coke, 5–15 mm.
Iron ore, Fe 17–40%, $SiO_2$ 3–8%

The furnace was operated for 48 hours. The slag and the iron were tapped intermittently, at a rate of about one quarter of the volume of the crucible. The tapping frequencies were 40 minutes for the iron, 20 minutes for the slag.

The resulting cast iron had the following composition: P 0.06%; S 0.002%; Si <0.2%; C 3–4%.

The slag had the following composition: $Al_2O_3$ 51%; $SiO_2$ 4.8%; CaO 41%; FeO 0.8% (point P of the attached ternary diagram).

The aluminous cement produced from this slag contains aluminates of lime which are responsible for its major outstanding characteristics. It contains less than 1.5% iron oxides. The cement has the following physical characteristics:

Initiation of setting period _____ 3 hours.
End of setting _____ 4 hours 30 min.
6-hour strength _____ 210 kg.
24-hour strength _____ 560 kg.

The cement mix conformed to the following standards: C/E=1.66, 800 kg. gravel, 400 kg. sand, 300 kg. melted cement.

Generally speaking the aluminous cements produced from slags according to the invention contain less than 1.5% iron oxide. They have initial setting times of from a few minutes to several hours, a total setting time generally within the same range, a 6-hour mechanical strength as high as 400 kg. or higher when mixed in the general proportions indicated above, and they have a high temperature resistance of up to 1700° C.

The above properties of the novel cements can be modified to suit various building specifications, as by varying the ratios among their various constituents $Al_2O_3$, $SiO_2$, CaO and FeO, and adjusting the iron reduction rate. The necessary modifications can readily be predetermined by preliminary tests for each particular application.

Moreover, the resulting aluminous cements have good resistance to light acids such as fatty and lactic acids.

What I claim is:

1. A method of simultaneous production of low-silicon cast iron and a high alumina content slag for producing a highly refractory high-alumina cement, which method comprises the steps of charging a furnace with coke and slagging constituents poor in silica, corresponding to a composition of 20–65% $Al_2O_3$, less than 7% $SiO_2$, 10–60% CaO and 1–7% iron oxides, with the following size ranges: $Al_2O_3$ 5–25 mm., CaO 5–15 mm., coke 5–50 mm., any iron ore added being in a non-sintered condition, maintaining a uniform temperature above 2000° C. in the blasting area by blowing hot air containing water vapor at a temperature of at least 600° C., and discharging separately the melted slag continuously and the low-silicon iron in batches, the tapping of the iron being effected at such a rate that the respective positions of the superimposed liquid phases remain substantially constant, the depth of the available slag corresponding to at least about 20 minutes' production.

2. The method of claim 1 in which said hot air contains added oxygen.

3. The method of simultaneous production in a furnace of low-silicon cast iron and a high-alumina content slag for producing a highly refractory high-alumina cement, which method comprises the steps of charging the furnace with coke and slagging constituents poor in silica, corresponding to a composition of 20 to 65% $Al_2O_3$, less than 7% $SiO_2$, 10 to 60% CaO, and 1 to 7% iron oxides; maintaining a uniform temperature above 2000° C. in the blasting area by blowing hot air containing water vapor at a temperature of at least 600° C.; and discharging separately the melted slag and the low-silicon iron, whereby there are obtained simultaneously a slag containing 38 to 70% $Al_2O_3$, 2 to 10% $SiO_2$, 45 to 28% CaO, and 0 to 1.5% of at least one iron oxide of the class consisting of FeO and $Fe_2O_3$ and a cast iron containing less than 0.3% Si.

4. The method of claim 3 wherein the size ranges of the charge are as follows: $Al_2O_3$ 5–22 mm., CaO 5–15 mm., coke 5–20 mm. and further wherein the $Al_2O_3$ content of the slag is 48 to 70%.

5. The method of claim 3 wherein the iron oxides in the charge are in the unsintered condition.

6. A method of simultaneous production of low-silicon cast iron and a high alumina content slag for producing a highly refractory high-alumina cement, which method comprises the steps of charging a furnace with coke and slagging constituents poor in silica, corresponding to a composition of 20–65% $Al_2O_3$, less than 7% $SiO_2$, 10–60% CaO and 1–7% iron oxides, with the following size ranges: $Al_2O_3$ 5–25 mm., CaO 5–15 mm., coke 5–50 mm., any iron ore added being in a non-sintered condition, maintaining a uniform temperature above 2000° C. in the blasting area by blowing hot air containing a liquid fuel at a temperature of at least 600° C., and discharging separately the melted slag continuously and the low-silicon iron in batches, the tapping of the iron being effected at such a rate that the respective positions of the superimposed liquid phases remain substantially constant, the depth of the available slag corresponding to at least about 20 minutes production.

7. The method of simultaneous production of low-silicon cast iron and a high-alumina content slag for producing a highly refractory high-alumina cement, which method comprises the steps of charging the furnace with coke and slagging constituents poor in silica, corresponding to a composition of 20 to 65% $Al_2O_3$, less than 7% $SiO_2$, 10 to 60% CaO, and 1 to 7% iron oxides; maintaining a uniform temperature above 2000° C. in the blasting area by blowing hot air containing a liquid fuel at a temperature of at least 600° C.; and discharging separately the melted slag and the low-silicon iron, whereby there are obtained simultaneously a slag containing 38 to 70% $Al_2O_3$, 2 to 10% $SiO_2$, 45 to 28% CaO, and 0 to 1.5% of at least one iron oxide of the class consisting of FeO and $Fe_2O_3$ and a cast iron containing less than 0.3% Si.

References Cited in the file of this patent

UNITED STATES PATENTS 2,727,815   Kjellman _____ Dec. 20, 1955

FOREIGN PATENTS 1,010,567   France _____ June 12, 1952
686,831    Great Britain _____ Feb. 4, 1953